(12) United States Patent
Mitra et al.

(10) Patent No.: US 12,079,217 B2
(45) Date of Patent: Sep. 3, 2024

(54) INTENT-AWARE LEARNING FOR AUTOMATED SAMPLE SELECTION IN INTERACTIVE DATA EXPLORATION

(71) Applicant: Adobe Inc., San Jose, CA (US)

(72) Inventors: Subrata Mitra, Karnataka (IN); Yash Gadhia, Mumbai Maharashtra (IN); Tong Yu, San Jose, CA (US); Shaddy Garg, Punjab (IN); Nikhil Sheoran, Chandigarh (IN); Arjun Kashettiwar, Pune Maharashtra (IN); Anjali Yadav, Rajasthan (IN)

(73) Assignee: Adobe Inc., San Jose, CA (US)

( * ) Notice: Subject to any disclaimer, the term of this patent is extended or adjusted under 35 U.S.C. 154(b) by 86 days.

(21) Appl. No.: 17/741,811

(22) Filed: May 11, 2022

(65) Prior Publication Data

US 2023/0367772 A1  Nov. 16, 2023

(51) Int. Cl.
  *G06F 16/2455*  (2019.01)
  *G06F 16/2453*  (2019.01)
  *G06F 16/2457*  (2019.01)
  *G06F 16/2458*  (2019.01)
  *G06F 18/21*    (2023.01)

(52) U.S. Cl.
  CPC .... *G06F 16/2455* (2019.01); *G06F 16/24542* (2019.01); *G06F 16/2457* (2019.01); *G06F 16/2474* (2019.01); *G06F 18/217* (2023.01)

(58) Field of Classification Search
  None
  See application file for complete search history.

(56) References Cited

U.S. PATENT DOCUMENTS

| | | | |
|---|---|---|---|
| 11,269,872 B1* | 3/2022 | Moo | G06F 16/243 |
| 2020/0341976 A1* | 10/2020 | Aggarwal | G06Q 10/10 |
| 2021/0124555 A1* | 4/2021 | Davlos | G06F 16/432 |
| 2021/0286851 A1* | 9/2021 | Kota | G06N 5/04 |
| 2021/0326742 A1* | 10/2021 | Rosset | G06F 16/90324 |
| 2023/0169080 A1* | 6/2023 | Iyer | G06N 3/044 |
| | | | 707/756 |
| 2023/0195765 A1* | 6/2023 | Mustafi | G06F 16/3329 |
| | | | 704/9 |

OTHER PUBLICATIONS

Agarwal et al., BlinkDB: Queries with Bounded Errors and Bounded Response Times on Very Large Data, Available Online at: https://sameeragarwal.github.io/blinkdb_eurosys13.pdf, 2013, pp. 29-42.

(Continued)

*Primary Examiner* — Christopher J Raab
(74) *Attorney, Agent, or Firm* — Kilpatrick Townsend & Stockton LLP

(57) ABSTRACT

Some techniques described herein relate to utilizing a machine-learning (ML) model to select respective samples for queries of a query sequence. In one example, a method includes receiving a query in a query sequence, where the query is directed toward a dataset. Samples are available as down-sampled versions of the dataset. The method further include applying an agent to select, for the query, a sample from among the samples of the dataset. The agent includes an ML model trained, such as via intent-based reinforcement learning, to select respective samples for queries. The query is then executed against the sample to output a response.

18 Claims, 8 Drawing Sheets

(56) References Cited

OTHER PUBLICATIONS

Aggarwal et al., Goal-driven Command Recommendations for Analysts, Available online at: https://arxiv.org/pdf/2011.06237.pdf, Nov. 12, 2020, pp. 160-169.

El et al., Automatically Generating Data Exploration Sessions Using Deep Reinforcement Learning, Available online At: https://u.cs.biu.ac.il/~somecha/pdf/atena_sigmod.pdf, Jun. 2020, pp. 1527-1537.

Galakatos et al., Revisiting Reuse for Approximate Query Processing, Proceedings of the VLDB Endowment, vol. 10, No. 10, Jun. 2017, pp. 1142-1153.

Guo et al., Dialog-based Interactive Image Retrieval, Available online at: https://proceedings.neurips.cc/paper/2018/file/a01a0380ca3c61428c26a231f0e49a09-Paper.pdf, 2018, pp. 678-688.

Kery et al., The Story in the Notebook: Exploratory Data Science using a Literate Programming Tool, Available online at: https://marybethkery.com/projects/Verdant/Kery-The-Story-in-the-Notebook-Exploratory-Data-Science-using-a-Literate-Programming-Tool.pdf, 2018, pp. 1-11.

Khan et al., WebLens: Towards Interactive Large-scale Structured Data Profiling, Available online at: https://dl.acm.org/doi/pdf/10.1145/3340531.3417443, Oct. 19-23, 2020, pp. 3425-3428.

Lei et al., Interactive Path Reasoning on Graph for Conversational Recommendation, Available online at: https://arxiv.org/pdf/2007.00194.pdf, Jul. 1, 2020, pp. 2073-2083.

Lillicrap et al., Continuous Control with Deep Reinforcement Learning, Available online at: https://arxiv.org/pdf/1509.02971.pdf, Jun. 5, 2019, 14 pages.

Liu et al., Dialogue Learning with Human Teaching and Feedback in End-to-End Trainable Task-Oriented Dialogue Systems, Available online at: http://aclanthology.lst.uni-saarland.de/N18-1187.pdf, 2018, pp. 2060-2069.

Liu et al., The Effects of Interactive Latency on Exploratory Visual Analysis, IEEE Transactions on Visualization and Computer Graphics, vol. 20, No. 12, 2014, pp. 2122-2131.

Lohr, Sampling: Design and Analysis, 2019.

Ma et al., Automatic Discovery of Structured Knowledge for Exploratory Data Analysis, Available online at: https://www.microsoft.com/en-us/research/uploads/prod/2021/03/rdm337-maA.pdf, Jun. 2021, pp. 1262-1274.

Milo et al., Automating Exploratory Data Analysis via Machine Learning: An Overview, Available online at: http://www.cs.tau.ac.il/~amitsome/pdf/eda_tutorial.pdf, Jun. 14-19, 2020, pp. 2617-2622.

Milo et al., Next-Step Suggestions for Modern Interactive Data Analysis Platforms, Available online at: https://dl.acm.org/doi/pdf/10.1145/3219819.3219848, Aug. 19-23, 2018, pp. 576-585.

Mnih et al., Human-Level Control Through Deep Reinforcement Learning, Nature, vol. 518, No. 7540, Feb. 26, 2015, 13 pages.

Park et al., VerdictDB: Universalizing Approximate Query Processing, SIGMOD, Available Online at: https://arxiv.org/pdf/1804.00770.pdf, Nov. 8, 2018, 19 pages.

Rule et al., Exploration and Explanation in Computational Notebooks, Available online at: https://dl.acm.org/doi/pdf/10.1145/3173574.3173606, Apr. 21-26, 2018, pp. 1-12.

Shi et al., How to Build User Simulators to Train RL-based Dialog Systems, Available online at: https://aclanthology.org/D19-1206.pdf, Sep. 2019, 11 pages.

Sutton et al., Reinforcement learning: An introduction., vol. 17, No. 2, Mar. 1999, 3 pages.

Yan et al., A Biterm Topic Model for Short Texts, Proceedings of the 22nd international conference on World Wide Web, May 2013, 11 pages.

Zhang et al., Conversational Contextual Bandit: Algorithm and Application, Available online At: https://arxiv.org/pdf/1906.01219.pdf, Apr. 2020, 11 pages.

* cited by examiner

300

SELECT COUNT(flight_id) FROM SAMPLE3 GROUP BY scheduled_arrival ▶
                                                              310

RL Agent chose: Sample 3

```
                flight_id
scheduled_arrival
AFTERNOON       15945
EVENING          9710    ─ 315
MORNING         16845
NIGHT            9810
```

SELECT COUNT(flight_id) FROM SAMPLE1 WHERE airline != VX GROUP BY scheduled_arri ▶
                                                              320

RL Agent chose: Sample 1

```
                flight_id
scheduled_arrival
AFTERNOON       15720
EVENING          9545    ─ 325
MORNING         17895
NIGHT            9390
```

FIG. 3

INTENT-AWARE LEARNING FOR AUTOMATED SAMPLE SELECTION IN INTERACTIVE DATA EXPLORATION

TECHNICAL FIELD

This disclosure generally relates to machine learning and, more specifically, to intent-aware learning for automated sample selection in interactive data exploration.

BACKGROUND

Data analysts often seek to gain insights into patterns in large datasets. For instance, these datasets can describe online activity of users, purchasing behaviors of customers, business operations, environmental phenomena, or a wide variety of other activities. By identifying patterns in datasets, analysts can enable decision-making that can benefit people and business in a wide range of fields. In exploratory data analytics (EDA), an analyst interactively organizes a dataset by, for instance, filtering, grouping, or plotting data, which can be performed by querying the dataset. A query engine processes each query and outputs a response. The analyst examines the query response to decide on a subsequent query. This cycle of queries and responses continues until the analyst ends the session. The sequence of queries entered by the analyst can lead to interesting insights, such as hidden patterns in the dataset. Often, EDA involves this type of interactive analysis and insight generation based on large datasets, which may include terabytes of data for instance.

EDA and other data analytics systems are limited in their abilities to timely run queries against large datasets by available computing resources. For instance, a query could take minutes or hours to run in typical computing environments. A long latency between a query and its result can hamper the cognitive flow of an analyst and, as a result, degrade the potential for insight generation. To address this issue, some EDA systems run queries against samples (e.g., subsets) of the dataset, rather than against the full dataset. The use of samples can enable faster query processing. However, EDA is a sequential process, and errors introduced due to sampling can divert the analysis flow because users often rely on previous query responses to decide the next queries to run. Thus, although using samples can address the latency issue in EDA systems to some degree, the use of sampling introduces errors that skew results.

SUMMARY

Some embodiments described herein relate to determining a particular sample to use for each query in a query sequence provided to an exploratory data analytics (EDA) system, so as to facilitate a workflow that preserves an implicit intent of a user. In particular, an embodiment includes an agent, which may be an intent-aware machine-learning model, to determine which sample to use based on implicit intents of query sequences. The agent may automatically select a sample, and thus an associated sampling strategy, of a dataset for a given query. In some examples, the agent has been trained to select an appropriate sample via reinforcement learning, such as deep reinforcement learning, based on a reward function that considers latency, intent, termination characteristics, or a combination of these factors.

In some embodiments, a user begins an EDA session with the EDA system by submitting a query to begin a query sequence. The agent receives the query. Based on a policy previously learned during training, as applied to the query and to a state of the agent, the agent selects a sample from among available samples of the dataset. A query engine processes the query against the sample to generate a response, and the EDA system outputs the response to the user.

Additionally, in some embodiments, the agent determines an implicit intent of the user based on the query sequence seen so far. For instance, the agent includes a topic model, which classifies the query sequence as belonging to a topic, and that topic is deemed to be the intent of the user and, thus, the intent associated with the query sequence. The agent updates its state to include the query, the response, the intent, and the computation cost for the query sequence so far. When the next query is received, this update state is used to determine an appropriate sample for that next query. The sequence of receiving a query, selecting a sample, generating a response, and updating the agent's state may be repeated until the user ends the EDA session. Thus, the agent facilitates an interactive data exploration workflow in the EDA system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 is an illustration of an example of an interface of the EDA system utilizing the sampling agent module, according to some embodiments described herein.

DETAILED DESCRIPTION

Figure 1:
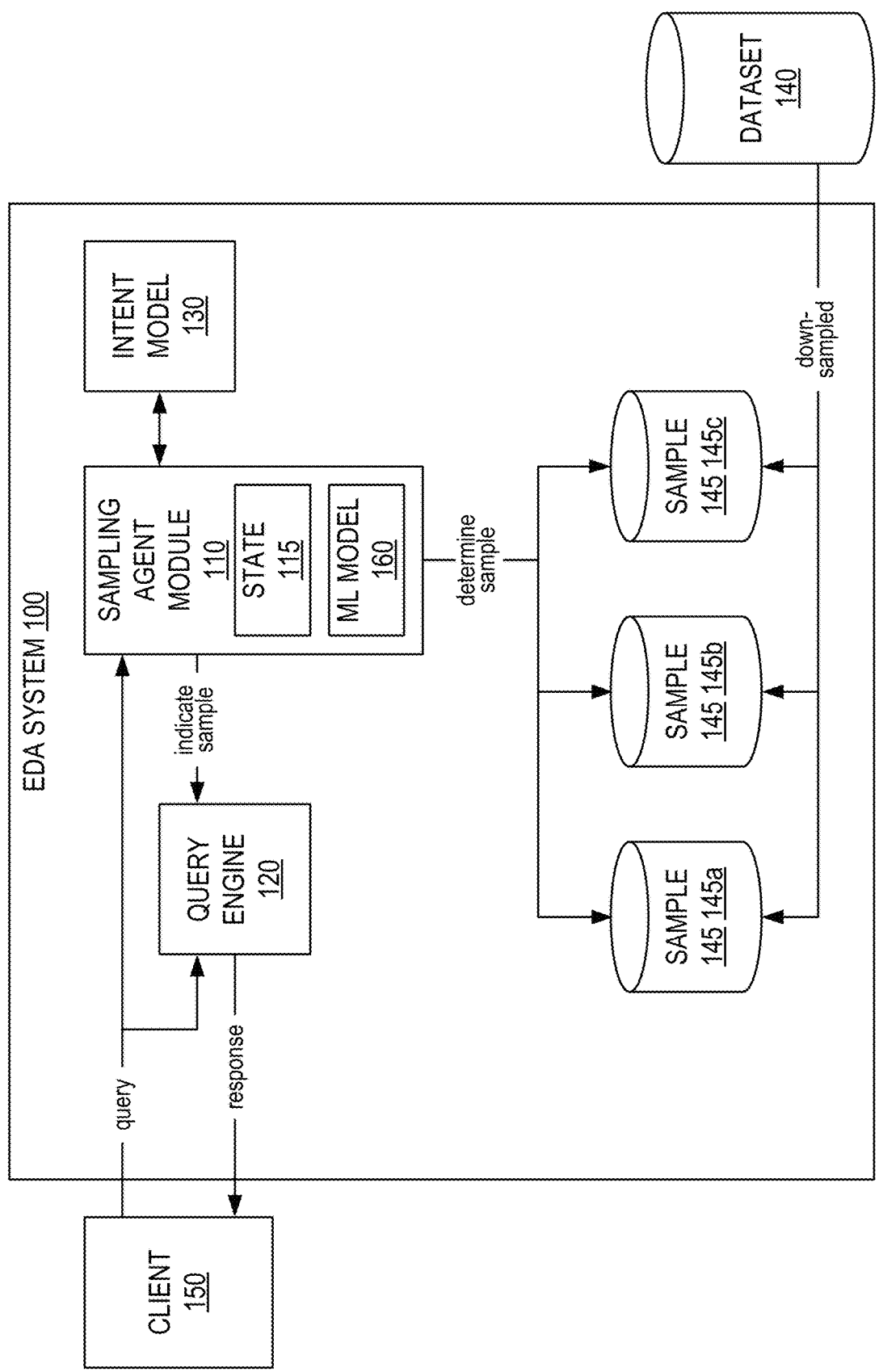
FIG. 1 is a diagram of an example of a sampling agent module executing as part of an exploratory data analytics (EDA) system, according to some embodiments described herein.

As described above, challenges arise in running queries against data samples rather than against a full dataset in exploratory data analytics (EDA) systems or other data analytics environments. Sampling creates approximation errors and can mislead a user (e.g., an analyst) in an interactive data exploration flow. For instance, the response of a previous query can be distorted due to the particular sample used and may prompt the user toward a non-optimal path of analysis. Numerous sampling techniques are available, and while a particular sampling technique for a given query could minimize such distortion, the best sampling technique for a given query depends on the particular structure of the query, the context of the query within a larger sequence of queries, and the underlying data distribution of the dataset. In an interactive data exploration workflow in an EDA system, where multiple types of queries are used in sequence, there is often not a single sampling strategy that should be used for each query. Thus, it is not always clear to an analyst which sampling technique to use, and that choice can be important for the data analysis.

Some embodiments described herein use an intent-aware sampling agent module, which is or includes a machine-learning model trained to determine which sample to use based on implicit intents of query sequences. A sampling agent module may automatically select a sample, and thus an associated sampling strategy, of a dataset for a given query. In some examples, the sampling agent module has been trained to select an appropriate sample via reinforcement learning (RL), such as deep reinforcement learning (DRL), based on a reward function that considers latency, intent, termination characteristics, or a combination of these factors.

The following non-limiting example is provided to introduce certain embodiments. In this example, a sampling agent module is intent aware. The sampling agent module is incorporated in an EDA system configured for interactive data exploration and useable by a user to facilitate insight generation. The EDA system additionally includes a query engine, which may be integrated with the sampling agent module, configured to execute queries. The EDA system is configured for data exploration of a dataset and, as such, has access to a set of samples of the dataset. Each sample was previously generated by applying a respective sampling strategy to the dataset.

In this example, the sampling agent module has already been trained, such as via reinforcement learning, to select samples for queries based on latency, intent, and termination characteristics, and as a result, the sampling agent module can select a respective sample against which each query can be processed with relatively low latency to preserve the analyst's implied intent in a given query sequence. At this point, the sampling agent module has been trained, but a state of the sampling agent module is blank, indicating that no queries have yet been received or processed for the query sequence in this EDA session.

In this example, a user begins an EDA session with the EDA system by submitting a query to begin a query sequence. The sampling agent module receives the query. Based on a policy previously learned during training, as applied to the query and to a state of the sampling agent module, the sampling agent module selects a sample from among available samples of the dataset. For instance, the query may be represented as a query vector, and that vector may be taken as input by the sampling agent module. In this example, the sampling agent module includes one or more neural networks, which process the query vector to determine the sample. A query engine then runs the query against the sample to generate and output a response in the form or a response vector. The EDA system thus outputs the response to the user in a format that facilitates human reading.

Additionally, in this example, the sampling agent module determines an implicit intent of the user based on the query sequence seen so far in this EDA session. For instance, the sampling agent module includes a topic model, which classifies the query sequence as belonging to a topic, and that topic is deemed to be the intent of the user and, thus, the intent associated with the query sequence. The sampling agent module then updates its state to include the query (e.g., the query vector), the response (e.g., the response vector), the intent, and the computation cost for the query sequence so far. The computation cost may be the cost (e.g., the time required) for processing each query seen in the query sequence against the respective samples 125 selected for those queries.

The sequence of receiving a query, selecting a sample, generating a response, and updating the sampling agent module's state may be repeated until the user ends the EDA session. Thus, in this example, the interactive data exploration workflow is facilitated by the sampling agent module and the sampling agent module's choices of samples. Specifically, the sampling agent module facilitates low latency query responses that preserve the user's intent, so as to preserve the potential for insight generate despite the use of samples in place of the dataset in full.

Certain embodiments described herein represent improvements in the technical fields of machine learning and interactive data analytics. Specifically, some embodiments utilize novel techniques in reinforcement learning to train a sampling agent module to perform intent-aware determination of samples in real time. As a result, interactive data analytics can proceed with low latency and preservation of intent, so as to produce query responses that represent the dataset properly with respect to the implied intent of a given query sequence. Thus, some embodiments can effectively facilitate insight generation that is not hampered by slow response times and, additionally, does not miss insights due to misleading responses resulting from poorly chosen samples.

As used herein, the term "sample" refers to a down-sampled representation of a dataset. For instance, a sample may be generated by applying a sampling strategy to a dataset to down-sample the dataset. A sample may thus be a subset of the dataset and not include all data of the dataset. In some embodiments, processing a sample of a dataset generally takes less time than processing the dataset as a whole.

As used herein, the term "query" refers to an operation defined over a sample or over a dataset in full. For instance, a query may direct an operation to certain rows or columns of the sample or dataset, leading to an output, or "response," based on data in the sample or dataset. In some example, a query could be defined in Structured Query Language (SQL) or in another language.

As used herein, the term "query sequence" or "sequence of queries" refers to an ordered series of queries. For instance, a human analyst could submit a query sequence as a series of queries, each query submitted after receiving a response from the previous query in the series. Each query in a query sequence may be directed against a common dataset. However, in some embodiments, each query need not be executed against the same sample of that common dataset.

As used herein, the term "intent" or "implicit intent" as it relates to a query sequence refers to a description or topic of to the query sequence. In some embodiments, the intent of a query sequence is a basis for selecting a sample for use in executing a given query of the query sequence.

As used herein, the term "intent-based reinforcement learning" refers to a type of machine learning, more specifically reinforcement learning. In some embodiments, intent-based reinforcement learning is reinforcement learning in which a machine-learning model is trained to consider an intent of a query sequence in generating an output.

As used herein, the term "EDA system" refers to a computer system configured to be used by a human user or an automated user to analyze datasets, such as for the purpose of discovering insights about those datasets. In some embodiments, an EDA system is implemented as one or more computing devices running program code to cause a processing unit to run queries, access data, or perform other tasks on datasets.

As used herein, the term "sampling agent module," also referred to as "agent," is a computer-implemented component configured to determine a sample of a dataset against which to run a query directed at that dataset. In some embodiments, a sampling agent module is implemented as program code, which, when executed by a processing unit causes the processing unit to determine samples for queries as described herein. Further, in some embodiments, a sampling agent module is or includes a machine learning model that learns via training how to select samples for queries.

Example Operations of an EDA System with a Sampling Agent Module

FIG. 1 is a diagram of an example of a sampling agent module 110, also referred to as an agent 110, executing as part of an exploratory data analytics system 100, according to some embodiments described herein. Generally, the EDA system 100 may facilitate interactive data exploration in which a query sequence is executed to analyze a dataset 140, enabling the discovery of insights about the dataset 140. In this disclosure, a "query sequence" or a "sequence of queries" is an ordered series of queries, such as might be provided in an actual or simulated EDA session with the EDA system 100. As shown in FIG. 1, the EDA system 100 may include the sampling agent module 110, a query engine 120, and an intent model 130, and the EDA system 100 may operate on a set of samples 145 of a dataset 140. In some embodiments, a client 150 may facilitate interactions between the EDA system 100 and a user at the client 150.

In some embodiments, the EDA system 100 includes program code running on one or more computing nodes of a cloud computing environment, such that services of the EDA system 100 are accessible by one or more clients 150 to enable users of the one or more clients 150 to analyze datasets through using the EDA system 100.

The dataset 140 can be a collection of various types of data. For instance, the dataset 140 can maintain information describing financial transactions, flight data, residential information, business transactions, web activity, purchase transactions, or various other data. In some embodiments, the dataset 140 is stored in one or more databases, database tables, text files, other storage objects, or a combination of these. For example, the dataset 140 may be stored in a SQL database or one or more SQL database tables.

Two or more samples 145 of the dataset 140, such as a first sample 145a, a second sample 145b, and a third sample 145c, may each be a subset of the dataset 140. For instance, if the dataset 140 is represented as one or more database table, each sample 145 may be a subset of the rows of those one or more database tables. Thus, each sample 145 represents the dataset 140 but is a proper subset (i.e., excluding some portion of the dataset 140) such that the sample 145 is smaller than the dataset 140 as a whole. Thus, it is typically faster to execute a query against a sample 145 rather than against the dataset 140 as a whole.

In some embodiments, each sample 145 is associated with a respective sampling strategy. For instance, the first sample 145a may be associated with a first sampling strategy and may be the result of applying the first sampling strategy to the dataset 140, the second sample 145b may be associated with a second sampling strategy and may be the result of applying the second sampling strategy to the dataset 140, and the third sample 145c may be associated with a third sampling strategy and may be the result of applying the third sampling strategy to the dataset 140. Each of the first, second, and third sampling strategies may be distinct, and the first sample 145a, the second sample 145b, and the third sample 145c may be distinct subsets of the dataset 140. The samples 145 as a collective may use multiple sampling strategies with each sample 145 using one or more of such multiple sampling strategies. In some examples, the sampling strategies used to create samples can be one or more of the following: uniform random sampling, systematic sampling, stratified sampling, proportional stratified sampling, cluster sampling, or diversity sampling.

In some embodiments, the samples 145 are predetermined or, more specifically, determined offline rather than on demand. In that case, the sampling agent module 110 selects an existing sample 145, and thus selects the associated sampling strategy, from among the available samples 145 that were predetermined. The use of predetermined samples 145 can reduce latency during runtime, as compared to generating samples 145 as needed. Additionally or alternatively, however, the sampling agent module 110 could generate a sample 145 on demand. In that case, for instance, the sampling agent module 110 selects a sampling strategy and then applies that sampling strategy to the dataset 140 to generate the sample. Generating samples 145 on demand can be useful in a case where the dataset 140 is dynamic but can dramatically increase latency. Thus, even when the dataset 140 is dynamic, it may be beneficial to generate the samples 145 offline and also update them offline as needed so as maintain a low latency during runtime.

The query engine 120 may be implemented as hardware, software, or a combination of both. The query engine 120 may be configured to run queries against the samples 145. In some embodiments, the query engine 120 is or includes program code that can execute a query against a sample 145 or against the dataset 140 as a whole. For example, if each sample 145 is or includes one or more SQL database tables, the query engine 120 may be a SQL query engine.

The sampling agent module 110 may be implemented as hardware, software, or a combination of both. In some embodiments, the sampling agent module 110 is implemented as program code, which, when executed by a processing unit causes the processing unit to determine samples for queries as described in detail below. An example of the sampling agent module 110 is or includes a machine learning model that learns, such as via intent-aware reinforcement learning, how to select sample for queries.

The sampling agent module 110 may receive, or otherwise access, a query provided to the EDA system 100 and may determine a sample 145 against which to execute the query. In some embodiments, the sampling agent module 110 bases its selection of a sample 145 on one or more of various factors, such as its current state 115, also referred to herein as its internal state 115. The state 115 may be a set of data, stored in a storage object, describing various information related to the sampling agent module 110. The state 115 may include prior queries, their respective responses, implicit intent, or computation cost. Thus, on two different occasions, given different states 115 of the sampling agent module 110, the sampling agent module 110 may select different samples 145 for the same query. Additionally or alternatively, the sampling agent module 110 may select the same sample 145 or different samples 145 for two distinct queries. Details of techniques used by the sampling agent module 110 to select samples 145 are provided below in detail.

As shown in FIG. 1, the sampling agent module 110 may include a machine learning (ML) model 160. Given an implicit intent of a query sequence, as determined by the intent model 130, the ML model 160 may determine an action to take based on that intent. The action can include selecting a specific sample 145 from those available. The ML model 160 may be implemented as hardware, software, or a combination of both. In some embodiments, the ML model 160 is a neural network, or the ML model 160 includes one or more sub-models, each of which is a neural network. As described below, the ML model 160 may be trained to use the information about intent determined by the intent model 130 and, based on this information, appropriately select samples 145 for queries that are part of query sequences provided in the EDA system.

Although the sampling agent module 110 is shown as being distinct from the query engine 120, this distinction is for illustrative purposes only. For instance, the query engine 120 and the sampling agent module 110 may include distinct hardware or software, or both, or may be integrated together by using shared hardware or software, or both. In some embodiments, the sampling agent module 110 may be integrated with the query engine 120. In that case, for instance, the query engine 120 receives a query, determines a sample 145 to use for the query, and then runs the query against the sample 145. Various implementations are possible and are within the scope of this disclosure.

Further, although the sampling agent module 110 is shown as being integrated with the EDA system 100, this integration is for illustrative purposes only, and implementations may vary. For instance, the sampling agent module 110 may be external to the EDA system 100 but in communication with the EDA system 100. Further, in some other embodiments, the sampling agent module 110 may be used for an application other than an EDA system 100, such as various applications with a large volume of data analyzed or otherwise used, such that sampling would be useful. Various implementations are possible and are within the scope of this disclosure.

The intent model 130 may be implemented as hardware, software, or a combination of hardware and software. Although the intent model 130 is shown as being integrated with the EDA system 100, the intent model 130 may be a separate component to which the EDA system 100 has access. In some embodiments, the intent model 130 is or includes a topic model. More specifically, an example of the intent model 130 is the Biterm Topic Model (BTM). As described in detail below, the intent model 130 can determine a set of topics, such as based on training data including query sequences. Given input in the form of a query sequence, the intent model 130 can then classify the query sequence as associated with a particular topic in the set of topics. The associated topic may be deemed the intent, or the implicit intent, of the query sequence. This is described in more detail below, particularly with reference to FIG. 6.

As shown in FIG. 1, the client 150 may be a computing device or a portion of a computing device configured to send queries to the EDA system 100 and to receive responses (i.e., query responses) from the EDA system 100. A user acting as an analyst can operate the client 150 to submit queries through an interface provided at the client 150. The client 150 may provide such queries to the EDA system 100, and the EDA system 100 may provide to the client 150 responses to running such queries against one or more samples 145 of the dataset 140. In some examples, the client 150 is or includes an application, such as a web application, configured to provide an interface for interactions with the EDA system 100. The client 150 may be integrated with the EDA system 100, such as being a portal for accessing the EDA system 100, or the client 150 may be a computing device separate from the EDS system 105 but in communication with the EDA system 100 over a network. One or multiple clients 150 may be communication with the EDA system 100 to enable access to the EDA system 100 for one or various human or automated users at a given time. Various implementations are possible and are within the scope of this disclosure.

Figure 2:
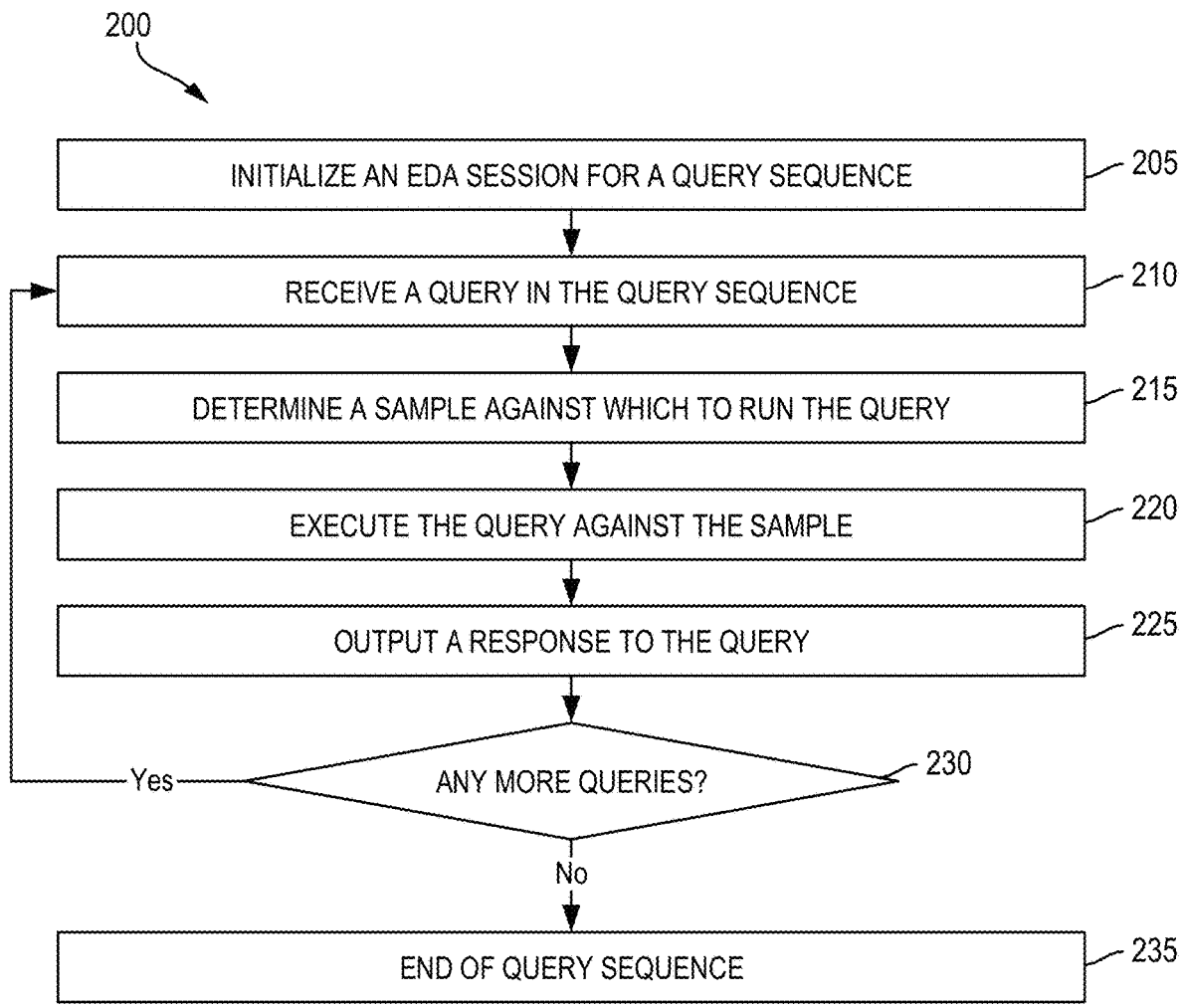
FIG. 2 is a flow diagram of an example of a process for facilitating interactive data exploration in the EDA system utilizing the sampling agent module, according to some embodiments described herein.

FIG. 2 is a flow diagram of an example of a process 200 for facilitating interactive exploratory data analysis utilizing the sampling agent module 110, according to some embodiments described herein. The process 200 depicted in FIG. 2 may be implemented in software executed by one or more processing units of a computing system, implemented in hardware, or implemented as a combination of software and hardware. This process 200 is intended to be illustrative and non-limiting. Although FIG. 2 depicts various processing operations occurring in a particular order, the particular order depicted is not required. In certain alternative embodiments, the processing may be performed in a different order, some operations may be performed in parallel, or operations may be added, removed, or combined together.

In some embodiments, this process 200 or similar is performed by the EDA system 100 and facilitated by the sampling agent module 110. Specifically, the EDA system 100 may perform this process 200 or similar for each EDA session (i.e., each session between a user and the EDA system 100) involving a query sequence. In some embodiments, prior to execution of this process 200 or similar, the sampling agent module 110 has already been trained to determine appropriate samples.

As shown in FIG. 2, at block 205, the process 200 involves initializing a new EDA session. In some embodiments, initializing the EDA session includes initializing a state 115 of the sampling agent module 110. For instance, initializing the state 115 of the sampling agent module 110 may involve removing data related to prior EDA systems. For instance, if the state 115 currently includes queries or responses from a prior EDA session, the sampling agent module 110 can zero out this data. However, the sampling agent module 110 may retain any learning that occurred. Such learning may already be incorporated into the ML model 160 of the sampling agent module 110.

Block 210 begins an iterative loop, each iteration of which focuses on a new query in a query sequence of the EDS session. At block 210, the process 200 involves receiving a query from a user of the EDA system 100. The user may be a human user or an automated user such as a bot, and the query may be part of a query sequence being submitted by the user. In some embodiments, the user submits the query via an interface to the EDA system 100 provided by way of a client 150.

FIG. 3 is an illustration of an example of an interface 300 of the EDA system 100 utilizing the sampling agent module 110, according to some embodiments described herein. The example of FIG. 3 demonstrates certain aspects of the process 200 for facilitating interactive exploratory data analysis utilizing the sampling agent module 110. In the example of FIG. 3, a user submits a sequence of queries related to a dataset 140 that includes information describing commercial airline flights.

In this example, a client 150 in use by the user presents an interface 300 such as that shown in FIG. 3. In some embodiments, the interface 300 enables the user to enter one or more queries. More specifically, the interface 300 may enable the user to enter a sequence, or series, of queries, one at a time, thereby enabling the user to building on previous queries and on previous responses to queries. The user submits a first query 310, which is "SELECT COUNT (flight_id) FROM SAMPLE GROUP BY scheduled_arrival."

At block 215 of FIG. 2, the process 200 involves determining a sample 145 against which to run the query received at block 210. In some embodiments, because the sampling agent module 110 is part of, or in communication with, the EDA system 100, the sampling agent module 110 has access to the query. As such, the sampling agent module 110 may determine a sample 145 to use based on the query and may output an indication of that sample 145. For instance, the indication may be an identifier, such as an integer, representing the sample 145, or the output may be a probability distribution over the available samples 145 such that the highest probability corresponds to the sample 145 selected. Techniques used by the sampling agent module 110 in some embodiments to determine a sample 145 are described in detail below with reference to FIG. 4.

Returning to the example of FIG. 3, after the user submits a first query 310, which is "SELECT COUNT(flight_id) FROM SAMPLE GROUP BY scheduled_arrival," the sampling agent module 110 receives the first query 310 and selects Sample 3 from a set of samples 145 that are available to the sampling agent module 110. The sampling agent module 110 provides to the query engine 120 an indication of Sample 3.

At block 220 of FIG. 2, the process 200 involves executing the query against the sample 145 determined at block 215. Specifically, in some embodiments, the query engine 120 runs the query received at block 210 against the sample 145 determined at block 215. The sample 145 acts a representation, or approximation, of the dataset 140 as a whole.

In the example of FIG. 3, for instance, the query engine 120 then runs the first query 310 against Sample 3, which represents the dataset 140, and generates a first response 315 to the first query 310.

At block 225, the process 200 involves outputting a response to the query. The response may be determined by the query engine 120 as a result of executing the query at block 220. For instance, in some embodiments, the response is a response vector of values that together answer the query. The EDA system 100 may output the response to the client 150, where the user can access that response. As such, the user can utilize the response in devising another query in the query sequence.

In the specific example of FIG. 3, the EDA system 100 indicates through the interface 300 that the sample 145 selected for use is Sample 3, and the EDA system 100 outputs an indication of the first response 315 as determined by the query engine 120. For instance, the EDA system 100 displays the first response 315 on the interface 300 as shown in FIG. 3. The sampling agent module 110 may be transparent to the user, such that, in some embodiments, the interface 300 does not require the user to select a sampling strategy or an existing sample 145.

In the process 200 of FIG. 2, at decision block 230, the process 200 involves detecting that another another query in the query sequence has been submitted. If another query is submitted, then the process returns to block 210 to receive that query and then proceed to process that query. However, if no additional queries are submitted in the query sequence, then the query sequence in the EDA session ends at block 235.

Returning to the example of FIG. 3, based on the first response 315, the user determines a second query 320 and submits the second query 320 via the interface 300. In the example of FIG. 3, the second query 320 is "SELECT COUNT(flight_id) FROM SAMPLE WHERE airline !=VC GROUP BY scheduled_arrival." On the backend, transparent to the user, the sampling agent module 110 receives the second query 320 and selects Sample 1 from a set of samples 145 that are available to the sampling agent module 110. The sampling agent module 110 provides to the query engine 120 an indication of Sample 1. The query engine 120 then runs the second query 320 against Sample 1, which represents the dataset 140, and generates a second response 325 to the first query 310. The EDA system 100 indicates, through the interface 300, that the sample 145 selected for use is Sample 1 and outputs an indication of the second response 325. More specifically, for instance, the EDA system 100 displays the second response 325 on the interface 300 as shown in FIG. 3.

The EDA system 100 may continue to receive queries submitted by the user. Each query can be determined by the user based on the responses to one or more previous queries, as the user investigates insights with additional queries. For each such query, the sampling agent module 110 may select a sample 145, and the query engine 120 may run the query against the sample 145 selected by the sampling agent module 110. The EDA system 100 may then output to the client 150, such as via an interface 300, a response to the query. In this manner, the EDA system 100 may facilitate exploratory data analysis.

Example Operations of a Sampling Agent Module to Determine a Sample

Figure 4:
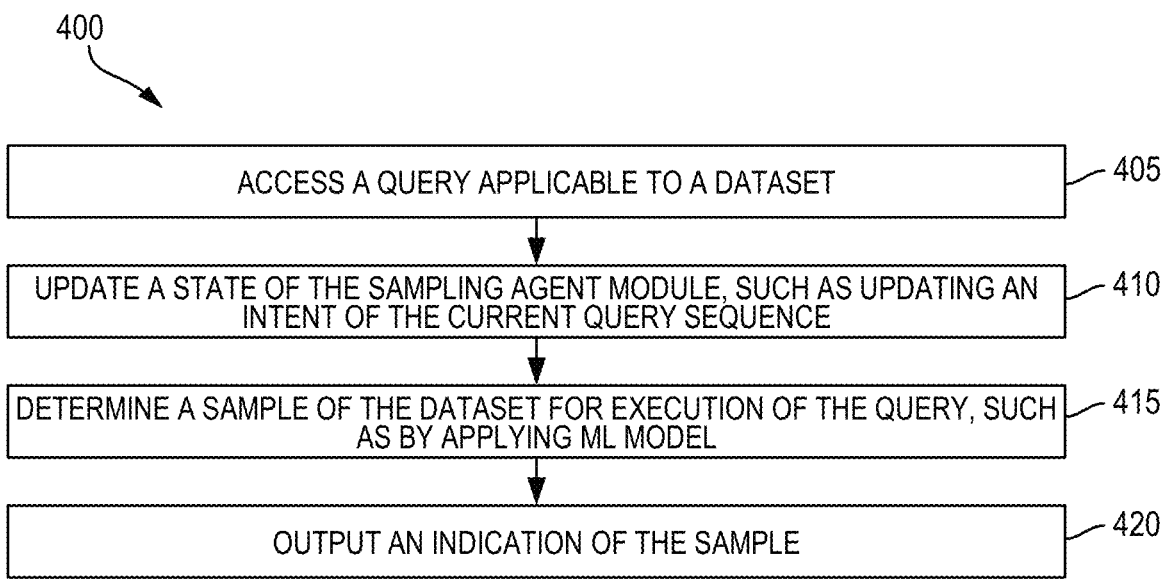
FIG. 4 is a flow diagram of an example of a process for determining a sample for a given query, according to some embodiments described herein.

FIG. 4 is a flow diagram of an example of a process 400 for determining a sample 145 for a given query, according to some embodiments described herein. In some embodiments, this process 400 or similar is performed by the sampling agent module 110 upon receipt of each query in a query sequence. For instance, the sampling agent module 110 may perform this process 400 or similar at block 215 of the above process 200 for facilitating interactive data exploration. In some embodiments, the sampling agent module 110 has already been trained (i.e., the ML model 160 included in the sampling agent module 110 has been trained) prior to operation of this process 400.

The process 400 depicted in FIG. 4 may be implemented in software executed by one or more processing units of a computing system, implemented in hardware, or implemented as a combination of software and hardware. This process 400 is intended to be illustrative and non-limiting. Although FIG. 4 depicts various processing operations occurring in a particular order, the particular order depicted is not required. In certain alternative embodiments, the processing may be performed in a different order, some operations may be performed in parallel, or operations may be added, removed, or combined together.

As shown in FIG. 4, at block 405, the process 400 involves accessing a query applicable to a dataset 140. For instance, the sampling agent module 110 may be incorporated into, or in communication with, the EDA system 100.

As such, the sampling agent module 110 may receive the query upon submission of the query to the EDA system 100, or the EDA system 100 may transmit the query to the sampling agent module 110.

At block 410, the process involves updating a state 115 of the sampling agent module 110. The state 115 of the sampling agent module 110 may include each query in the current query sequence prior to the current one accessed at block 405, along with each corresponding response. In some embodiments, each query may be represented in the state 115 as a vector, as described below, and each response may be represented as a vector, as also described below. The state 115 may additionally include the intent currently associated with the current query sequence. The state 115 may additionally include the computation cost for the current query sequence up to the present (e.g., the cost of executing previous queries in the current query sequence against the respective samples 145 selected for them).

As mentioned above, the operations of this process 400 may be performed in a different order than the order shown and described herein. For instance, in some embodiments, the operations involved in updating the state 115 can occur after selecting each sample 145 and after running the query against the sample 145 and obtaining the response. Thus, if the state 115 was updated after a response was determined for the previous query, if any, then the state 115 need not be updated at block 410.

If the state 115 is not up to date, such as may be the case if the state 115 was not updated after a previous query in the current query sequence was processed, then the state 115 may not include complete information about the previous query. In that case, the sampling agent module 110 may update the state 115 by adding to the state 115 the previous query and the previous query response (i.e., the response to the previous query). In some embodiments, the state 115 additionally includes an intent associated with the query sequence. In that case, the sampling agent module 110 may apply the intent model 130 to the query sequence, possibly including the query most recently submitted and accessed at block 405, to determine an updated intent of the query sequence. As updated, the intent may be in the form of an intent distribution indicating an association weight, or probability, for each available intent. If the intent model 130 is a topic model, then the intent may be a topic distribution indicating an association weight, or probability, for each available topic. The sampling agent module 110 may replace the intent stored in the state 115 with the updated intent. Additionally or alternatively, the state 115 includes the computation cost of the query, which may be a running total of computation costs (e.g., time to compute) of prior queries in the current query sequence. In that case, the sampling agent module may add, to the computation cost stored in the state 115 already, the computation cost of the previous query.

At block 415, the process 400 involves determining a sample 145 of the dataset 140 for application of the query. For instance, determining the sample 145 includes selecting the sample 145 from a set of samples 145 that were previously determined. In some embodiments, the sampling agent module 110 may determine the sample 145 based on the state 115 accessed at block 410. In some embodiments, as described in detail below with reference to FIG. 6, the sampling agent module 110 may take an action $a_t$, corresponding to selecting a particular sample 145, in accordance with a target function $a_t = \mathrm{argmax}_{a \in A} \pi_\theta(a|s_t)$. Additionally or alternatively, in some embodiments, the ML model 160 of the sampling agent module 110 has previously been trained to approximate this function. As such, the sampling agent module 110 may determine the sample 125 by applying the ML model. This target function and training approximation of the target function are explained in detail below with reference to FIG. 6.

In some embodiments, the ML model 160 may input the query accessed at block 405 and the state 115 accessed at block 410 and, based on these inputs, generate an output indicating an action. For instance, the output could be a probability distribution. More specifically, the output could be a vector of fields having dimension equal to the number of samples 145 available to the EDA system 100, where each field corresponds to a respective sample 145. Each field may be a weight indicating the degree to which the corresponding sample 145 is an appropriate choice. The sampling agent module 110 may output the probability distribution for the query engine 120 to interpret, or the sampling agent module 110 may select the sample 145 corresponding to the field having the highest weight or, depending on how the ML model was trained, the lowest weight. Details on training the sampling agent module 110 are described in detail with reference to FIGS. 5-6.

At block 420 of the process 400 of FIG. 4, the process 200 involves outputting an indication of the sample 145 determined at block 415. Using this output, the query engine 120 can execute the query against that sample 145 to determine the query response.

Example Operations in Training a Sampling Agent Module

As described above, the sampling agent module 110 may include an ML model 160 configured to determine a sample 145 by selecting that sample 145 from among a set of samples 145 available to the sampling agent module 110 and to the EDA system 100. Prior to use of the sampling agent module 110 in operation, the sampling agent module 110, and more specifically the ML model 160 of the sampling agent module 110, may learn to appropriately select samples 145. In some embodiments, the sampling agent module 110 learns via reinforcement learning, such as deep reinforcement learning.

Figure 5:
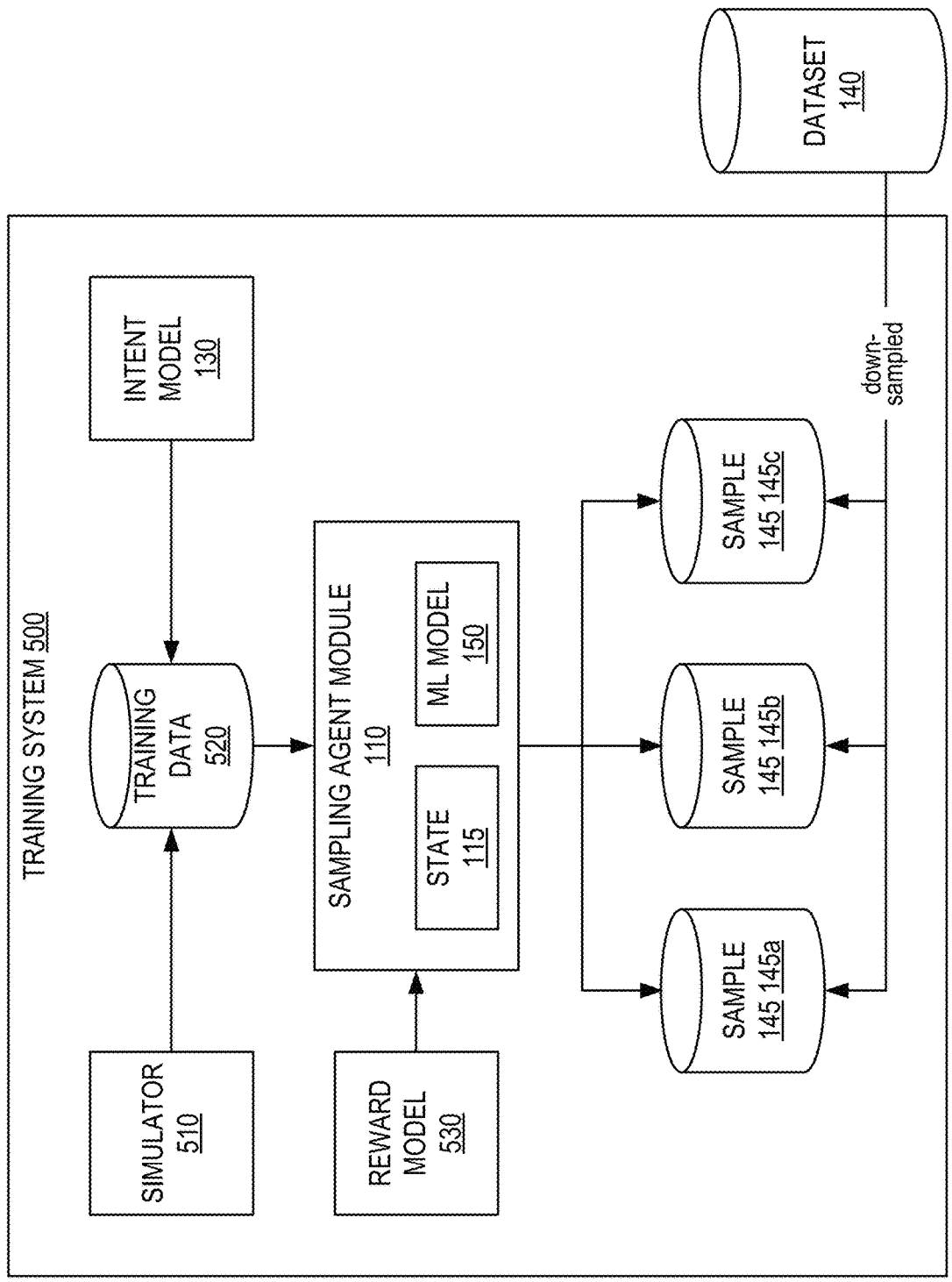
FIG. 5 is a diagram of a training system for training the sampling agent module to determine samples, according to some embodiments described herein.

FIG. 5 is a diagram of a training system 500 for training the sampling agent module 110, according to some embodiments described herein. The training system 500 may train the sampling agent module 110 to select a sample 145 for a given query received as part of a query sequence in an EDA session. The training system 500 may be implemented as hardware, software, or a combination of both. In some embodiments, the training system 500 is implemented in the same environment (e.g., by the same one or more computing devices) as the EDA system 100. In some other embodiments, however, the training system 500 may be separate from the EDA system 100 in which the sampling agent module 110 operates. For instance, the training system 500 may train the sampling agent module 110, and then the sampling agent module 110 may be copied to the EDA system 100, or otherwise made accessible to the EDA system 100, for use.

As shown in FIG. 5, the training system 500 may include, in addition to the sampling agent module 110 itself, the intent model 130 and a simulator 510. Generally, the simulator 510 may simulate query sequences used in training data 520 to train both the intent model 130 and the sampling agent module 110. The training system 500 may train the sampling agent module 110 to approximate a selection function for selecting samples 145, where that selection function is based on a specific reward model 530 that rewards the sampling agent module 110 for certain choices. The rewards model may be based on preserving implicit intent, among other factors, as determined by the intent model 130. The training system 500 may also include, or have access to, a query engine 120 configured to execute queries during training. For instance, the query engine 120 may be the same query engine 120 or similar as used in the EDA system 100, as shown in FIG. 1, along with the sampling agent module 110.

The simulator 510 may be implemented as hardware, software, or a combination of both. In some embodiments, the simulator 510 is a machine-learning model, such as a neural network, and the simulator 510 has been trained to simulate the generation of query sequences as might be submitted by a human analyst for execution against the dataset 140 as a whole. To this end, for instance, prior to operation in the training system 500, the simulator 510 may be trained on actual query sequences made by human analysts against the dataset 140. As such, the simulator 510 may be able to generate realistic query sequences, similar to those of human analysts, based on the dataset 140.

In some embodiments, the training system 500 trains the sampling agent module 110 through reinforcement learning. In RL, an agent, such as the sampling agent module 110, interacts with a system, such as the training system 500, and thereby learns an optimized policy. At each time step t, the agent observes the state 115 of the system $s_t$ and chooses to perform an action at that changes the state to $s_t$+1 at timestep t+1, and for that action, the agent receives a reward rt. The goal of the agent during training is to learn a policy to maximize its expected cumulative discounted reward, $E[\Sigma_{t=0}^{\infty} \gamma^t r_t]$, also referred to herein as its total reward, where E is the expected value of the cumulative discounted reward, and where $\gamma \in (0,1)$ determines how much future rewards contribute to the total reward. In deep reinforcement learning, a sub-category of RL, neural networks are used as agents to handle large state and action spaces. In some embodiments described herein, the sampling agent module 110 is trained via RL or, more specifically, via DRL. To this end, the training system 500 uses the reward model 530, described in detail below, to provide rewards that encourage the sampling agent module 110 to learn to select appropriate samples 145.

In some embodiments, the training system 500 trains the sampling agent module 110 in a simulation of the EDA system 100, in which the simulator 510 provides query sequences, but additionally or alternatively, the sampling agent module 110 could be trained during operation of the EDA system 100 itself. During training, the sampling agent module 110 receives a series of queries. For each such query, the sampling agent module 110 checks its current state 115 and then performs the action of selecting a sample 145. For each such query and corresponding action (i.e., sample selection), the training system 500 applies the reward model 530 to provide a reward to the sampling agent module 110. Based on the rewards, the sampling agent module 110 learns to choose appropriate samples 145 to potentially minimize the cost of running queries (e.g., in terms of latency and termination conditions) while preserving intent of an analyst performing the analysis in an exploratory data analysis workflow.

In some embodiments, during both training and operation, the sampling agent module 110 has access to n sampled datasets, also referred to as samples 145, each of which is a sample 145 of a dataset 140. The samples 145 make up a set, $D=\{d_1, d_2, \ldots d_n\}$ for $i \in [1, n]$, and each sample 145 in the set is a down-sampled version of the original dataset 140. The computation cost array, $C=\{c_1, c_2, \ldots c_n\}$ for $i \in [1, n]$, is the down-sampling percentage for the corresponding $d_i$. In some embodiments, the computation cost $c_i$ associated with a sample $d_i$ is directly proportional to the number of rows in the sample 145. During training, the training system 500 may train the sampling agent module 110 to select from among these samples 145, and in some embodiments, these same n samples 145 may be available during operation of the EDA system 100.

During operation, the sampling agent module 110 may encounter a sequence of l queries, $Q=\{q_1, q_2, \ldots q_l\}$ for $i \in [1, l]$ to be run on the dataset 140, denoted as Do. The intent, or implicit intent, of a user interacting with the EDA system 100 is denoted herein as $I_{orig}$. In some embodiments, the decision problem of the sampling agent module 110 can be formulated as a Markov Decision Process (MDP). At each step t in the query sequence, the state 115 of the sampling agent module 110 is $s_t$, and the possible action space is $\{d_i\}$ for $i \in [1, n]$. The state $s_t$ can be represented by a vector that includes one or more of (e.g., all of) the following fields: k query vectors representing the previous queries in the query sequence; k corresponding response vectors (i.e., responses to such queries); an indication of intent of the query sequence, such as an intent distribution (e.g., a topic disribution) output by the intent model 130; and computation cost (e.g., cumulative latency) of the previous queries combined. Formally, the decision problem can be as follows:

$$s_t = \{((q_{t-1}, v_{t-1}), (q_{t-2}, v_{t-2}), \ldots (q_{t-i}, v_{t-i}))_{i=1}^k, I_t, C_t\}$$

In the above, $v_i$ represents a response corresponding to the query $q_i$. Each query and response in the state 115 may be represented as a vector, and specifically, each query $q_i$ may be represented as a six-dimensional vector, as described in more detail below.

In some embodiments, the sampling agent module 110 is trained to choose an action a (i.e., selecting a sample 145 corresponding to a from the set of samples of the dataset 140) at step t such that the total cost, $C_{total} = \Sigma_{i=0}^{l} c_i$, for the query sequence is minimized while preserving an intent $I_{gen}$ closely matching the implicit intent $I_{orig}$. After the sampling agent module 110 performs an action by selecting a sample $d_t \in \{d_i\}_{i=1}^n$, the state 115 of the sampling agent module 110 changes to $s_{t+1}$, and the query engine 120 computes $v_t$ to be output to the user. To solve the MDP problem, some embodiments of the training system 500 utilize an intent-aware RL framework with the intent-based reward model 530 described herein.

Typically, reinforcement learning aims to learn an optimal policy for interacting with an unknown and potentially complex environment. A policy is defined by a conditional distribution π(a|s), which denotes the probability of choosing an action a∈A when an agent is at state s∈S. If the agent chooses an action a E A at state s E S, the agent receives a reward r(a|s). In some embodiments, the sampling agent module 110 is the agent being taught via reinforcement learning. To this end, the sampling agent module 110 may receive a reward for each action it takes (i.e., each sample 145 it selected) for each query in a query sequence. The total of such rewards corresponds to a reward for the query sequence as a whole. Each reward may be a function of a combination of one or more of the following: a latency reward that encourages the sampling agent module 110 to choose a sample 145 that will lead to low latency when processing each query of the query sequence; an intent reward that encourages the sampling agent module 110 to preserve an implicit intent of the query sequence; and a termination reward that encourages the sampling agent module 110 to preserve the final results of the query sequence. These reward types are described below in detail.

Figure 6:
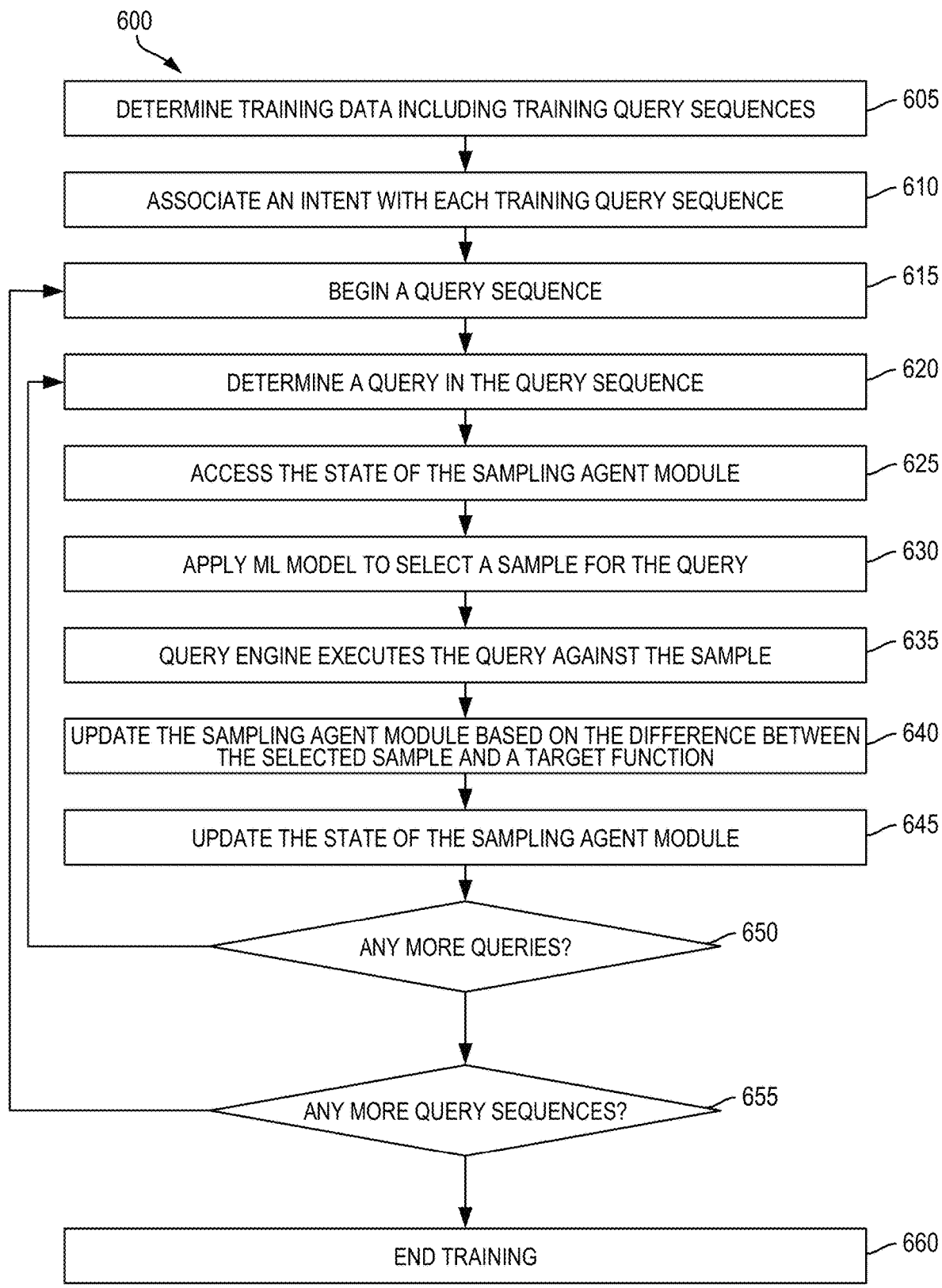
FIG. 6 is a flow diagram of a process for training the sampling agent module to determine samples, according to some embodiments described herein.

FIG. 6 is a flow diagram of a process 600 for training the sampling agent module 110, according to some embodiments described herein. In some embodiments, the training system 500 performs some or all operations in this process 600 to train the sampling agent module 110, and the process 600 uses the framework described above. The training system 500 may perform this process 600 or similar to train the sampling agent module 110 prior to operation of the sampling agent module 110, such as prior to the performance of the above process 200 for interactive exploratory data analysis utilizing the sampling agent module 110.

The process 600 depicted in FIG. 6 may be implemented in software executed by one or more processing units of a computing system, implemented in hardware, or implemented as a combination of software and hardware. This process 600 is intended to be illustrative and non-limiting. Although FIG. 6 depicts various processing operations occurring in a particular order, the particular order depicted is not required. In certain alternative embodiments, the processing may be performed in a different order, some operations may be performed in parallel, or operations may be added, removed, or combined together.

As shown in FIG. 6, at block 605, the process 600 may involve determining training data 520 for use in training the sampling agent module 110. As described above, in some embodiments, a simulator 510 is pre-trained to generate query sequences based on execution against the dataset 140 as a whole. Thus, the simulator 510 may generate training query sequences for inclusion in the training data 520. For example, the simulator 510 may generate thousands of training query sequences for inclusion in the training data 520. In some embodiments, the training query sequences may be used in the training data 520, or one or more subsets of the query sequences may be withheld and used for testing after training. Each training query sequence simulates choices made by a human analyst when queries are run against the dataset 140 as a whole. If historical query sequences provided by human analysts in the past are available, then such historical query sequences may be used as training query sequences in the training data in addition to, or instead of, the training query sequences generated by the simulator 510. Each training query sequence may have a predetermined length 1. During training, the training query sequences may be treated as ground truth.

In some embodiments, operations in the training query sequences of the training data 520 may be limited to a set of operations, and in that case, query sequences during runtime may be limited to the set of operations as well. The set of operations allowed can include, either inclusively or exclusively, Filter, Group, and Back operations. For instance, a Group operation takes as input (1) a group attribute, (2) an aggregation function, and (3) an aggregate attribute. The Group operation groups rows of the dataset 140 based on the group attribute and aggregates rows of the dataset 140 by applying the aggregation function to the aggregation attribute of such rows. For instance, a Filter operation takes as input (1) a column identifier specifying a column of the dataset 140, (2) a comparison operator (e.g., equals, contains), and (3) a term, which can be either textual or numerical in some examples. The Filter operation filters the dataset 140 to extract rows that have values in the specified column that result in a value of TRUE when comparing such values to the term given the comparison operator. For instance, a Back operation allows a backtrack to the previous display (i.e., the previous response vector) in order to enable an alternative exploration path.

Each query $q_i$ of a query sequence Q, in the training data 520 or during operation, may be represented as a six-dimensional vector as follows:

$$q_i=[\text{OperationType,ColumnID,FilterOperator,FilterTerm,AggColumnID,AggFunction}]$$

In some embodiments, OperationType takes a value of {0,1,2}, where 0 represents a Back operation, 1 represents a Filter operation, and 2 represents a Group operation. If other operations are being used, then the possible values of OperationType can be adjusted appropriately. The simulator 510 may generate the training query sequences, QS={$Q_1$, $Q_2$, ... $Q_m$} for an integer m, based on use of the dataset 140 in full.

At block 610, the process 600 involves associating a respective intent with each training query sequence. Some embodiments of the training system 500 utilize the intent model 130 for this purpose. As described above, the intent model 130 may be a topic model such as BTM. For instance, the intent model 130 identifies topics among the training query sequences and clusters the training query sequences according to those topics, such that each training query sequence is associated with a respective topic. These topics may then be used as intents as the training proceeds. More specifically, for instance, if a first training query sequence is associated with a first topic, then that first training query sequence is deemed to have a first intent, also referred to herein as the original intent of the training query sequence, equal to the first topic. In some embodiments, in an unsupervised learning process of associating the training query sequences with respective intents, the intent model 130 learns to associate input query sequences with respective intent distributions (e.g., topic distributions) indicating to what degree each input query sequence is associated with each topic.

At block 615, the process 600 involves beginning a current query sequence for training. This block 615 begins an outer loop, with each iteration focused on a current query sequence, which changes in each iteration. In some embodiments, beginning the current query sequence involves initializing a state 115 of the sampling agent module 110. For instance, initializing the state 115 may involve removing any queries, responses, intents, or computation costs from the state 115 to create a fresh start in terms of queries that have been seen in the current query sequence. However, the sampling agent module 110 may retain any learning that has already occurred. For instance, such learning may already be incorporated into the ML model 160 included in the sampling agent module 110.

At block 620, the process 600 involves determining a query as part of the current query sequence. In some embodiments, the simulator 510 generates the query. For instance, if this is not the first query in the current query sequence, the simulator 510 may generate the query based on previous queries in the current query sequence as well as based on responses to those previous queries.

At block 625, the process 600 involves accessing the state 115 of the sampling agent module 110. In some embodiments, for instance, the sampling agent module 110 checks its own state 115. The state 115 of the sampling agent module 110 may include each query in the current query sequence prior to the one determined at block 620, along with each corresponding response. The state 115 may additionally include the intent, if any, currently associated with the current query sequence. The state 115 may additionally include the computation cost for the current query sequence up to the present (e.g., the cost of executing previous queries in the current query sequence against the respective samples 145 selected for them).

At block 630, the process 600 involves selecting a sample 145 for the query determined at block 620. Specifically, for instance, selecting the sample 145 may involve selecting the sample 145 from the set of samples 145 that were previously determined. In some embodiments, the sampling agent module 110 may select the sample 145 based on the state 115 accessed at block 625. Further, the sampling agent module 110 may select the sample 145 with an aim to maximize the reward it will receive according to the reward model 530.

Below, the reward model 530 used in some embodiments is described in detail to illustrate how the sampling agent module 110 can perform its selection. Each reward may be a function of a combination of one or more of the following: a latency reward that encourages the sampling agent module 110 to choose a sample 145 that will lead to low latency when processing each query of the current query sequence; an intent reward that encourages the sampling agent module 110 to preserve an implicit intent of the current query sequence; and a termination reward that encourages the sampling agent module 110 to preserve expected final results of the current query sequence.

An aspect of rewards provided to the sampling agent module 110 may be a latency reward. In some embodiments, the sampling agent module 110 facilitates an interactive exploratory data session, and as such, the sampling agent module 110 may be configured to take an action (i.e., selecting a sample 145 from among those available) in real-time, such as within a second or less after a user submits a query. Typically, the query can be processed more quickly against a smaller sample 145, such as a sample made up of fewer rows, rather than against a larger sample 145. Generally, this is because, when applying the query to the selected sample 145, the query engine 120 reads the entire selected sample 145, which takes an amount of time related to the size of that selected sample 145. Hence, some embodiments provide a latency reward that is based on number of rows in the selected sample 145 such that, for instance, the latency reward increases as sample (e.g., the number of rows in a sample 145) decreases. In other words, the latency reward may be negatively correlated with the sample size of the selected sample 145.

In some embodiments, at a state $s_t$, when the sampling agent module 110 takes an action $a_t$, the number of rows in the selected sample 145 is $|T_s|$, and the number of rows in the dataset 140 is $|T|$. In that case, the reward for taking that action may be computed as follows:

$$r(s_t, a_t) = 1 - \frac{|T_s|}{|T|}$$

For a current query sequence of l queries, the total latency reward may be computed as follows:

$$R_{latency} = \sum_{t=1}^{l} r(s_t, a_t)$$

As described above, the reward given to the sampling agent module 110 may include other aspects in addition to or alternatively to the latency reward. These other aspects may include an intent reward, a termination reward, or both.

An aspect of rewards provided to the sampling agent module 110 may be an intent reward. In some embodiments, the intent reward is based on intent divergence. As used in this disclosure, "intent divergence" or "divergence of intent" refers to an implicit intent of a query sequence, and of simulated user of that query sequence, diverging from an original intent indicated in the training data 520. In some embodiments, choosing the smallest sample 145, as encouraged by the latency reward, will lead to reduced waiting time for the user. Choosing the smallest sample 145 can also sometimes lead to divergence of intent after some point. The intent reward may therefore balance the latency reward to some degree. In some embodiments, the intent reward includes a combination of one or more components, denoted below as $R_{distance}$ and $R_{topic}$.

The $R_{distance}$ component of the intent reward may be based on the distance between the current query sequence and the closest training query sequence from the training data 520. Generally, Distance($Q_1$, $Q_2$) denotes the distance between a first query sequence $Q_1$ and a second query sequence $Q_2$. The $R_{distance}$ component for the current query sequence $Q_t$ may be computed as follows:

$$R_{distance} = 1 - \min(\{Distance(Q_t, Q_i)\}_{i=1}^{m})$$

In the above formula, each $Q_i$ is a training query sequence in the training data 520, and m is the number of training query sequences in the training data 520. The Distance function can be defined in various ways and may be based on the queries themselves, the query responses, or a combination of the queries and respective query responses, and the Distance function may consider both content and order (e.g., the order of queries and the order of query responses). Some embodiments of the training system 500 use the EDA-Sim distance metric. EDA-Sim considers the query sequence itself as well as the order and content of the query responses from the two query sequences (e.g., the current query sequence $Q_t$ and a training query sequence $Q_i$) and gives a similarity score. Thus, computing $R_{distance}$ in some embodiments involves finding in the training data 520 the closest training query sequence $Q_{ground}$ to the current query sequence $Q_t$ and then determining the distance contribution $R_{distance}$ based on the closeness to that closest training query sequence $Q_{ground}$.

In some embodiments, intent-aware sample selection, as performed by the sampling agent module 110, involves identifying an intent of the current query sequence $Q_t$ or, in other words, of the user (e.g., a simulated user during training). As mentioned above, the training query sequences in the training data 520 may be considered to be ground truth and may model a variety of intents. For the current query sequence $Q_t$, the intent model 130 may output a probability distribution $\phi$ over the topics identified in the training data 520 as $\phi(Q_t) = \{P(t=t_i|Q=Q_t)\}_{i=1}^{k}$. Here, k is the number of topics identified in the training data 520, and each $t_i$ corresponds to a topic. To determine an original intent of the current query sequence, the training system 500 can compute the argmax over the probability distribution $I_{Q_t}$=argmax $(\{P(t=t_i|Q=Q_t)\}_{i=1}^{k})$. In some embodiments, the computed intent $I_{Q_t}$ is used as an original intent, $I_{orig}$, acting as a target for the current query sequence. Thus, the intent reward may be based on divergence between this original intent $I_{Q_t}$ and the implicit intent as the query sequence proceeds.

Figure 7:
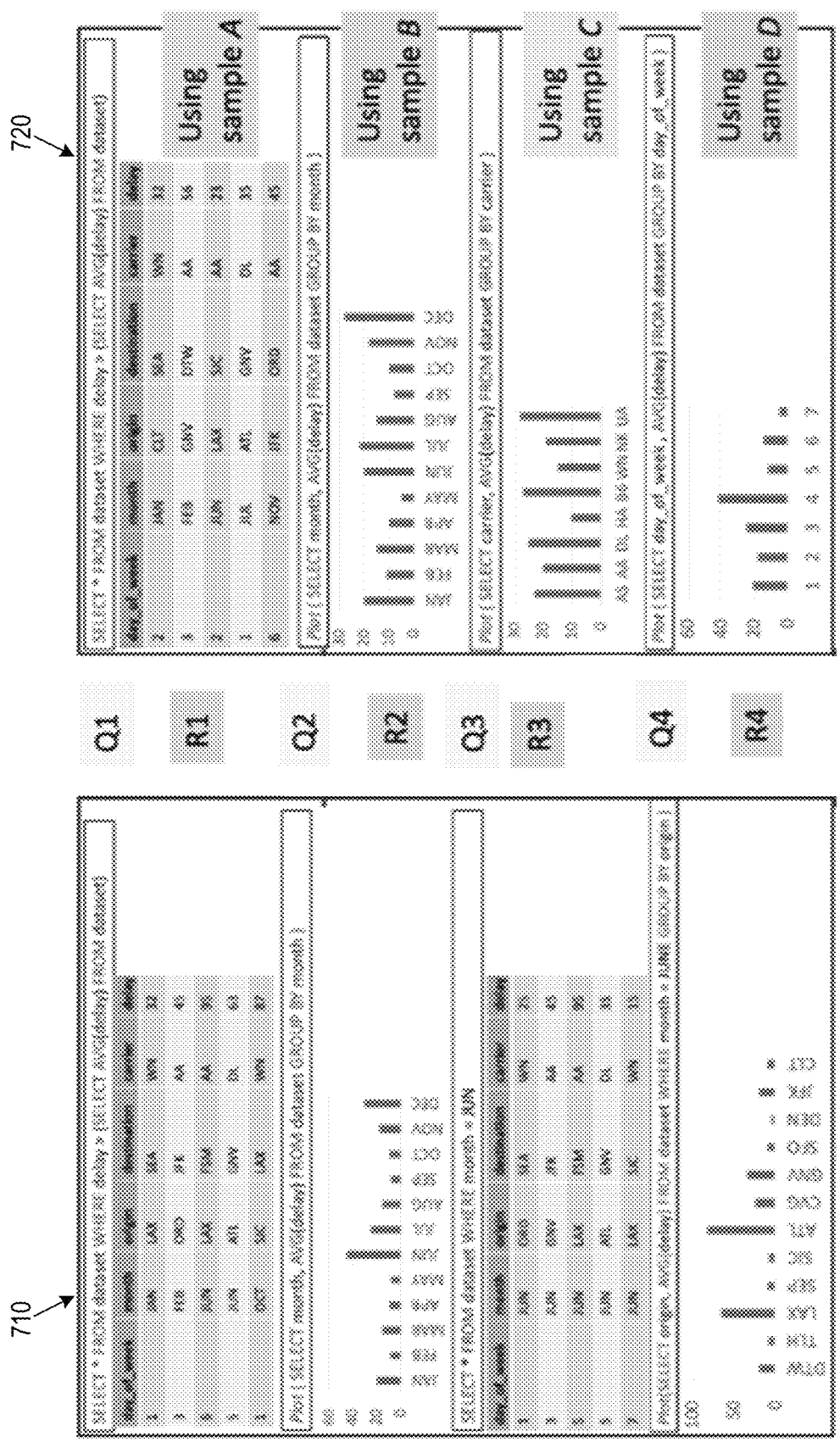
FIG. 7 illustrates an example of diverging intents due to sample selection, which is sought to be avoided during training, according to some embodiments.

FIG. 7 illustrates an example of diverging intents due to sample selection, which is sought to be avoided according to some embodiments. The left side of FIG. 7 illustrates a training query sequence 710 that might be generated by the simulator 510 or by a human analyst for execution against the dataset 140 as a whole. The training query sequence 710 is the closest training query sequence to a current query sequence 720 and has an original intent used as the original intent $I_{orig}$ of the current query sequence 720. The right side of FIG. 7 illustrates the current query sequence 720, which includes queries run against selected samples 145 of the dataset 140. For both the training query sequence 710 and the current query sequence 720, the first, second, third, and fourth queries are denoted respectively as Q1, Q2, Q3, and Q4, and the first, second, third, and fourth responses are denoted respectively as R1, R2, R3, and R4.

As illustrated in FIG. 7, the intent of the current query sequence 720 eventually diverges from the original intent. The divergence is evident in that, despite the training query sequence 710 and the current query sequence 720 beginning with the same queries Q1 and Q2, the queries of each diverge after the first two queries due to the difference in responses that begin with the responses R2 after the second queries Q2 on each side. The use of samples 145 causes this difference in responses, which causes the intent divergence. If the example of FIG. 7 occurred during training, the reward provided to the sampling agent module 110 would be impacted by this divergence as described herein.

Referring back to computation of the intent reward, as discussed above, the $R_{distance}$ component may be based on the EDA-Sim distance. However, there are cases where query sequences with different intents may have a low EDA-Sim distance and may thus appear close. Thus, in addition to, or alternatively to, being based on $R_{distance}$, the intent reward may be further based on a matching of topic distributions. The reward contribution $R_{topic}$ may be defined as follows:

$$R_{topic}=1-D(\phi(Q_t),\phi(Q_{ground}))$$

In the above, the function D may be the Euclidean Distance Measure, and $Q_{ground}$ may be the same closest training query sequence $Q_{ground}$ used to compute $R_{distance}$. This contribution to the intent reward can ensure that topic matching (i.e., intent matching) comes into consideration in determining the reward related to intent.

In some embodiments, the intent reward can thus be defined as follows:

$$R_{intent}=R_{distance}+\delta \times R_{topic}$$

The above intent reward can ensure that the distance between the current query sequence and the closest training query sequence is small and also that the topic distribution closely matches.

An aspect of rewards provided to the sampling agent module 110 may be a termination reward, which can encourage preservation of final results as compared to the closest training query sequence. For instance, the "final results" may refer to a final set of one or more queries at the end of the current query sequence.

It can be said that the last few queries in query sequence of an EDA session are the most important because these are the queries associated with insights. The latency reward considers timing, and the intent reward considers matchings across query sequences and their intents. Even when using these rewards, however, those insights might not be preserved. The termination reward can help to ensure that such insights are preserved. In some embodiments, the termination reward includes a combination of one or more components, denoted below as $R_{match}$ and $R_{recall}$.

In some embodiments, the $R_{match}$ contribution is a binary reward, taking a value of either TRUE (1) or FALSE (0). For instance, the value of $R_{match}$ is 1 if the last j queries of the current query sequence, as supported by the sampling agent module 110 (i.e., the sampling agent module 110 is selecting samples 145), match with the last j queries of the closest training query sequence $Q_{ground}$. The value of j can be system defined or set by a user, and the value of j can be absolute (e.g., 3) or relative (e.g., 10% of the number of queries 1 in the query sequence). Otherwise, if the last j queries of the current query sequence differ from those of the closest training query sequence, the value of $R_{topic}$ is 0.

The other component $R_{recall}$ may be based on the results of the query sequence (i.e., the ordered sequence of query responses to the query sequence) rather than on the queries themselves. Different queries might lead to similar insights, and since the training system 500 may seek to preserve the insights themselves, rather than just the queries, this component of the termination reward can be based on the insights. For the current query sequence $Q_t$, given the closest training query sequence $Q_{ground}$, the $R_{recall}$ component of the termination reward may be computed:

$$R_{recall}=\text{top\_k\_recall}(Q_t,Q_{ground})$$

In the above, top_k_recall can output a similarity value between the last k queries in each of the query sequence $Q_t$ and the closest training query sequence $Q_{ground}$, where k is an integer greater than 0.

The termination reward as a whole may be computed:

$$R_{term}=R_{match}+\zeta \times R_{recall}$$

Using each of the latency reward, the intent reward, and the termination reward, an embodiment of the reward model 530 of the training system 500 provides a reward for the sampling agent module 110 as follows:

$$J_R(\pi)=E_{a_t \sim \pi_\theta}[Rt]$$

In the above, $J_R$ is the reward function for the sampling agent module 110 given all the rewards $R_t$, $\sigma_\theta$ refers to the learned policy of the sampling agent module 110, and at refers to the action taken given that learned policy. A given reward can be computed using the reward function $R_t$ as follows:

$$R_t=R_{latency}+\alpha \times R_{intent}+\beta \times R_{term}$$

Referring back to block 630 of FIG. 6, as mentioned above, the sampling agent module 110 may determine a sample 145 based on the rewards it receives. Specifically, given the above, the sampling agent module 110 may take an action $a_t$, corresponding to selecting a particular sample 145, in accordance with a target function:

$$a_t=\text{argmax}_{a \in A}\sigma_\theta(a|s_t)$$

In other words, the sampling agent module 110 may select an action from among a set of actions, equating to selection from an existing set of samples 145, so as to maximize the reward at the current time step. The action $a_t$ may correspond to a corresponding sample $d_t$, which may then be deemed the sample 145 determined for this query.

In some embodiments, however, given the high computation time typically needed to compute the action $a_t$ with the above function, the training system 500 is training the sampling agent module to approximate this function. For example, the training system 500 uses the Advantage Actor Critic (A2C) technique for training with a policy-gradient basis. The ML model 160 of the sampling agent module 110 may include a policy network and a value network, each of which may be a respective neural network acting as a respective function approximator for each of policy and value. In some implementations, each of such neural networks includes two hidden layers each having sixty-four latent dimensions.

During a training phase, the ML model 160 of the sampling agent module 110 may learn an optimal policy $\pi(a|s_t)$. Thus, at block 630, the sampling agent module 110 may use the ML model 160 to select the sample 145 for the query, and the ML model 160 will continue to be refined throughout training.

At block 635 of the process 600 of FIG. 6, the process 600 involves determining a response to the query determined at block 620. For instance, the query engine 120 may execute the query against the sample 145 determined at block 630. The query engine 120 may then output a response, such as a response vector. For instance, the response may include a sub-table including a subset of rows, a subset of columns, or a subset of rows and columns of the dataset 140 and of the sample 145 determined at block 630.

At block 640, the process 600 involves updating the sampling agent module 110 based on the action chosen at block 630. To this end, the training system 500 may update the sampling agent module 110 based on a difference between the sample 125 selected and the sample 125 indicated by the target function $a_t = \mathrm{argmax}_{a \in A} \pi_\theta(a|s_t)$. More specifically, for instance, the training system 500 may update one or more weights of one or more neural networks of the ML model 160 of the sampling agent module 110, so as to minimize the difference between the action $a_t$ output by the ML model 160 and the target function $a_t = \mathrm{argmax}_{a \in A} \pi_\theta(a|s_t)$.

At block 645, the process 600 may involve updating the state 115 of the sampling agent module 110. For instance, the sampling agent module 110 may update its state 115 by adding to the state 115 the query determined at block 620, as represented by a query vector, and the response determined at block 635, as represented by a response vector. Updating the state 115 may also include updating the computation cost stored in the state 115 by adding the computation cost of the query against the sample 145 selected. In some embodiments, updating the state 115 may also include updating the intent stored in the state 115, such as by applying the intent model 130 to the current query sequence, including the query determined at block 620, to generate an updated intent distribution. The intent in the state 115 may be changed to the updated intent distribution.

At decision block 650, the process 600 involves determining whether any more queries remain in the current query sequence. In some embodiments, each query sequence used during training has a fixed number of queries 1. In that case, at decision block 650, the training system 500 may decide whether the query determined at block 620 is other than the 1th query in the query sequence. If one or more queries remain in the query sequence, then the process 600 may return to block 620 to determine an additional query for the current query sequence. However, if there are no more queries in the current query sequence, then the process 600 proceeds to decision block 655.

At decision block 655, the process 600 involves determining whether any more query sequences should be executed for training the sampling agent module 110. In some embodiments, the training system 500 may be configured to run a certain number of query sequences during training. In that case, the training system 500 may determine at decision block 655 whether that certain number has been met. In some other embodiments, the training system 500 continues introducing queries until the sampling agent module's choices are sufficiently close to the target function $a_t = \mathrm{argmax}_{a \in A} \pi_\theta(a|s_t)$. If the query sequence is deemed not to be the final query sequence for training, then the process 600 may return to block 615 to begin another query sequence. However, if the query sequence is the final query sequence, the process 600 may proceed to block 660.

At block 660, the training may end. The sampling agent module 110 may now be fully trained and ready for use in the EDA system 100. In some embodiments, though, one or more additional training epochs may be used to refine the training.

Example of a Computing System for Implementing the Sampling Agent Module

Figure 8:
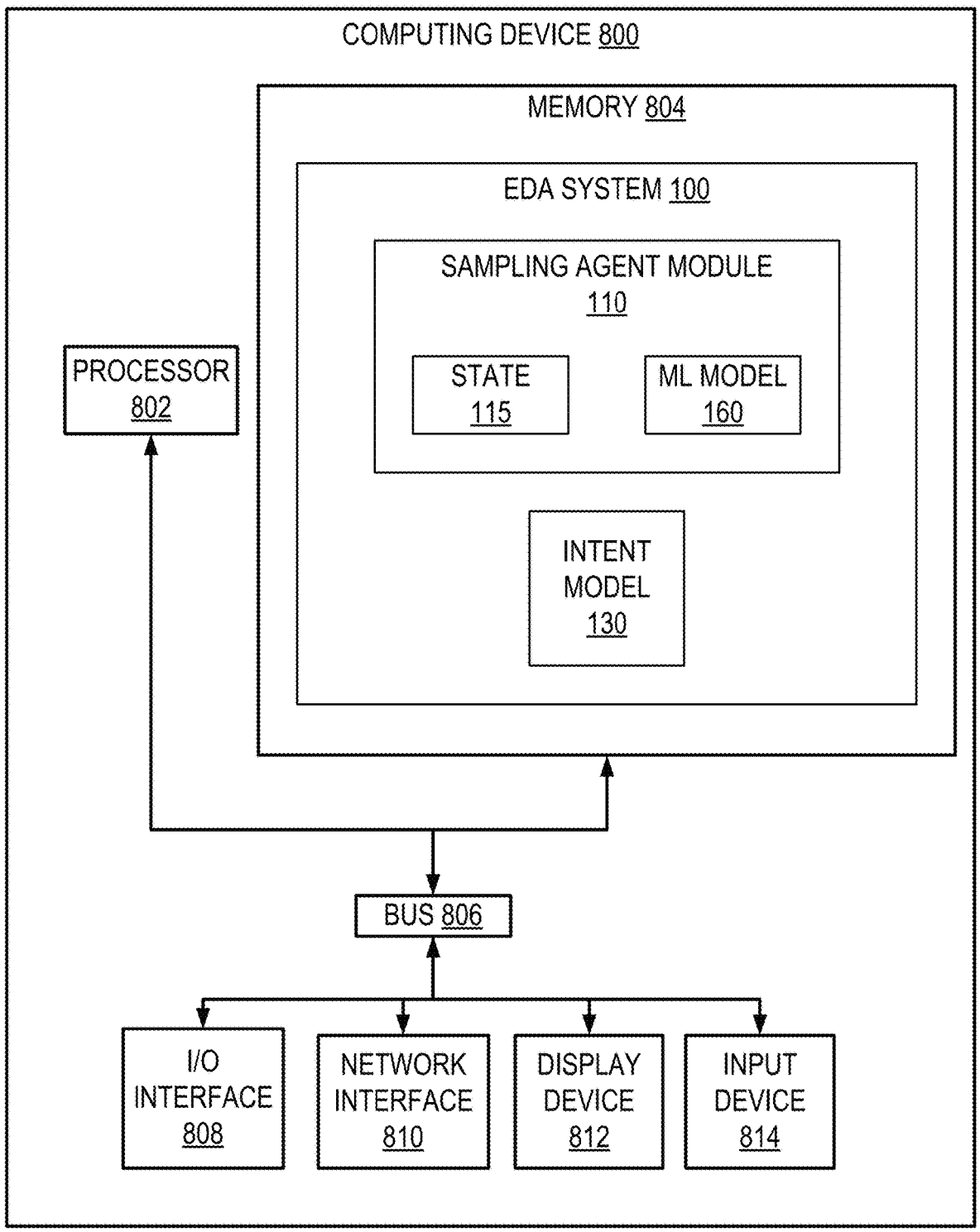
FIG. 8 is a diagram of an example of a computing system for performing certain operations described herein, according to some embodiments.

FIG. 8 is a diagram of an example of a computing system 800 for performing certain operations described herein, according to some embodiments. A suitable computing system or group of computing systems can be used for performing the operations described herein. For example, FIG. 8 depicts an example of a computing system 800 that can be used to execute the sampling agent module 110, the training system 500 for the sampling agent module 110, or various other aspects described herein. In some embodiments, as shown for instance, the computing system 800 executes the EDA system 100, including the sampling agent module 110 and the intent model 130, and an additional computing system having devices similar to those depicted in FIG. 8 (e.g., a processor, a memory, etc.) executes the training system 500. Thus, the training system 500 can train the sampling agent module 110, and then the sampling agent module 110 may be copied to the computing system 800 shown for operation. In other embodiments, the computing system 800 executes both the EDA system 100 and the training system 500.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 300 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the intent model 130, the sampling agent module 110, other aspects of the EDA system 100, or applications that perform one or more operations described herein. The program code may be resident in the memory device 804 or any suitable computer-readable medium and may be executed by the processor 802 or any other suitable processor. In additional or alternative embodiments, program code for the training system 500 is stored in the memory device 804 of the computing system 800 or is stored in different a memory device of different computing systems.

The computing system 800 can access other models, datasets, or functions of the EDA system 100 or training system 500 in any suitable manner. In some embodiments, some or all of one or more of these models, datasets, and functions are stored in the memory device 804 of a computer system 800, as in the example depicted in FIG. 8. In other embodiments, such as those in which the training system 500 is executed on a separate computing system, that separate computing system executes the training system 500 and can provide access to necessary models, datasets, and functions as needed. For instance, the sampling agent module 110 and the intent model 130 may be copied to the computing system 800 after training in the training system 500 on a separate computing system. In additional or alternative embodiments, one or more models, datasets, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a separate computing device acting as a client 150) via a data network using the network interface device 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
receiving a query in a query sequence, the query directed toward a dataset;
applying a sampling agent module to select, for the query, a sample from among samples of the dataset, wherein the sampling agent module includes an ML model trained to select respective samples for queries via intent-based reinforcement learning, and wherein selecting the sample comprises:
providing, as input to the ML model, previous queries in the query sequence and respective responses to the previous queries,
determining a computation cost as a sum of respective computation costs of previous samples selected for the previous queries in the query sequence,
providing the computation cost as further input to the ML model, and
selecting the sample based on output from the ML model;
executing the query against the sample; and
outputting a response to the query.

2. The method of claim 1, wherein applying the sampling agent module to select the sample comprises:
determining an implicit intent associated with the query sequence comprising the query; and
providing the query and the implicit intent of the query sequence as input to the ML model.

3. The method of claim 2, wherein the implicit intent comprises a topic distribution, and wherein determining the implicit intent comprises applying a topic model to the query sequence.

4. The method of claim 2, wherein the ML model is trained to approximate a target function configured to optimize a reward model, wherein the reward model is based on comparing the implicit intent to a target intent.

5. The method of claim 4, wherein the reward model is further based on latency associated with the query sequence and on termination characteristics associated with an end of the query sequence.

6. The method of claim 2, further comprising training the ML model to select the sample from among the samples, wherein training the ML model comprises:
accessing training data comprising training query sequences executed against the dataset;
associating a respective intent with each training query sequence in the training data;
generating a simulated query in a simulated query sequence;
determining a selected sample by applying the ML model to the simulated query and to an internal state of the sampling agent module, the internal state comprising a current intent of the simulated query sequence; and
updating weights of the ML model based on a comparison of the selected sample to output from an intent-based target function.

7. The method of claim 6, further comprising:
training a topic model based on the training query sequences;
applying the topic model to the simulated query sequence to determine an implicit intent of the simulated query sequence; and
storing the implicit intent in the internal state of the sampling agent module for input into the ML model.

8. The method of claim 6, wherein the intent-based target function is configured to optimize a reward model based on latency, intent, and termination characteristics.

9. The method of claim 1, further comprising:
receiving a second query in the query sequence, the second query directed toward the dataset;
applying the sampling agent module to select, for the second query, a second sample from among the samples of the dataset, wherein the second sample selected for the second query differs from the sample selected for the query; and
executing the second query against the second sample.

10. A method comprising:
receiving, by a sampling agent module, a query related to a dataset;
determining, by the sample agent module, an implicit intent of a query sequence to which the query belongs;
providing, by the sample agent module, the query and the implicit intent of the query sequence as input to a machine-learning (ML) model configured to select a sample from among samples of the dataset;
selecting, by the sample agent module, the sample based on output from the ML model, wherein the ML model is configured to optimize a reward model based on latency associated with the query sequence and on termination characteristics associated with an end of the query sequence; and
running, by a query engine, the query against the sample to generate a query response.

11. The method of claim 10, wherein:
the implicit intent comprises a topic distribution; and
determining the implicit intent of the query sequence comprises applying a topic model to the query sequence.

12. The method of claim 10, further comprising:
determining, by the sample agent module, an internal state comprising the implicit intent, the query sequence, and respective responses to previous queries of the query sequence,
wherein the internal state is input to the ML model for determining the sample.

13. The method of claim 12, wherein:
the internal state input to the ML model for determining the sample further comprises a computation cost associated with the query sequence; and
the computation cost is a sum of respective computation costs of previous samples selected for previous queries in the query sequence.

14. The method of claim 10, wherein the ML model is trained via reinforcement learning to approximate a target function configured to optimize a reward model, wherein the reward model is based on comparing the implicit intent to a target intent.

15. A system comprising:
a non-transitory computer-readable medium storing computer-executable program instructions and a dataset comprising samples; and
a processor communicatively coupled to the non-transitory computer-readable medium for executing the computer-executable program instructions, wherein executing the computer-executable program instructions configures the processor to perform operations comprising:
receiving a query in a query sequence, the query directed toward a dataset;
applying a sampling agent module to select, for the query, a sample from among samples of the dataset, wherein the sampling agent module includes an ML model trained to select respective samples for queries via intent-based reinforcement learning;
providing, as input to the ML model, previous queries in the query sequence and respective responses to the previous queries;
determining a computation cost as a sum of respective computation costs of previous samples selected for previous queries in the query sequence;
providing the computation cost as further input the ML model;
executing the query against the sample; and
outputting a response to the query.

16. The system of claim 15, wherein executing the computer-executable program instructions configures the processor to perform further operations comprising:
applying a topic model to the query sequence to determine an implicit intent as a topic distribution; and
updating a state of the sampling agent module to include the implicit intent, previous queries in the query sequence, and respective responses to the previous queries.

17. The system of claim 16, wherein the ML model is trained via the intent-based reinforcement learning to approximate a target function configured to optimize a reward model, wherein the reward model is based on comparing the implicit intent to a target intent.

18. The system of claim 15, wherein executing the computer-executable program instructions configures the processor to perform further operations comprising: (i) receiving a second query in the query sequence, the second query directed toward the dataset, and (ii) applying the ML model to select, for the second query, a second sample from among the samples of the dataset, wherein the second sample selected for the second query differs from the sample selected for the query; and
executing the second query against the second sample.

* * * * *